Feb. 15, 1966　　H. MILLENDORFER　　3,235,397
REFLECTION-REDUCING ARRANGEMENTS
Filed April 19, 1962

INVENTOR
Hans Millendorfer

BY
Richard S. Striker
ATTORNEY

United States Patent Office 3,235,397
Patented Feb. 15, 1966

3,235,397
REFLECTION-REDUCING ARRANGEMENTS
Hans Millendorfer, Wiener Neudorf, Lower Austria, assignor to C. Reichert Optische Werke Aktiengesellschaft, Vienna, Austria
Filed Apr. 19, 1962, Ser. No. 188,797
Claims priority, application Austria, Apr. 21, 1961, A 3,140/61
8 Claims. (Cl. 117—33.3)

This invention concerns improvements in or relating to reflection-reducing arrangements.

Reflection-reducing coatings have been in use for many years upon optical surfaces in order to minimize the reflective properties of surfaces of glass or other dielectric materials used in optical systems. They serve the purpose in all optical systems of diminishing scattered light, and consequently improving, particularly in the case of multi-lens systems, the quality and brightness of the image formed.

One type of known reflection-reducing coatings consists of a single layer or coating upon the optical surface, consisting of a substance having a low refractive index, the optical thickness ($n.d$) of this layer, calculated as the multiple of the actual thickness ($d$) times the refractive index ($n$), being ¼ of the wave length $\lambda_0$ which is the mean wavelength of the light or other radiation band whose reflections are to be reduced or eliminated. Such a coating is formed most frequently of magnesium fluoride ($MgF_2$). Reflection-reducing coatings of this type have the advantage that the spectrum of such residual reflection as does take place merges away smoothly on both sides of the mean wave length, in other words the transition from maximum reflection-suppression at the mean wave length to lesser degrees of suppression at adjacent wave lengths is gradual and consequently the spectrum of the reflected light shows no intense colour bands. On the other hand, this type of reflection-reducing coating has the disadvantage that, when applied to glass or other dielectric material with a low refractive index, the minimum value for reflection remains significant even at the mean wave length and, for example, may well exceed 1% of the incident light in the case of glass of the kind used for mirrors.

This last disadvantage is overcome by another known type of reflection-reducing coating, built up from a thin layer of a highly refractive substance and a thicker layer of a low-refractive substance. The thin layer in this type of coating has an optical thickness ($n.d$) much less than $\lambda_0/4$, and the thicker layer has an optical thickness ($n.d$) greater than $\lambda_0/4$, and this type of coating has the advantage that, whatever the refractive index of the glass or other dielectric material to which it is applied, it is possible to achieve a residual reflection which is zero for the mean wave length. The disadvantage is that on each side of the mean wave length the residual reflection increases sharply, and thus when the mean wave length is of a value which lies within the visible spectrum, the consequence is that to a greater or lesser extent the residual reflections are intensely coloured. Under certain critical optical conditions, this in turn can lead to a brightening of the shadow areas of the image in these same colours, or on the other hand, in the case of optical systems comprising several successively arranged coating optical surfaces, it can lead to the transmission of a colour spot of the complementary colour—thus, with an apparently purple coating, that is to say, one which seems to reflect a purple colour, the transmitted light may appear yellow-green.

Because of these difficulties with the simple and widely-used reflection-reducing coatings just described, attempts have for a long time been made to develop a so-called "Achromatic" reflection-reducing coating, that is to say, one which will minimize reflection over substantially the whole of the visible spectrum to more or less the same extent, or will at least reduce such reflections to insignificant proportions, thus avoiding the inadequacies of either the single or double layer coatings now in use.

To some extent it has in fact been possible to make such "Achromatic" reflection-reducing coatings by building up a double-layer coating, both layers of which consist of material which does not absorb light, the upper layer having a low refractive index and having an optical thickness $\lambda_0/4$, while the lower layer has a high refractive index and an optical thickness of $\lambda_0/2$. The curves secured by plotting either percentage transmission or percentage reflection against wave length show, in the case of the residual reflection, two minima separated by a small intermediate maximum, the actual location and thus separation of the minima and maximum, and thus the breadth of the band of radiation in respect of which maximum reflection reduction can be achieved, depending upon the precise values of the refractive indices of both the coating materials and the optical surface to which they have been applied. Reflection-reducing coatings of this nature, which approximate to the desired "Achromatic" state, have the advantage of being relatively easy to build up and of giving, when a favourable combination of refractive indices of the various layers and underlying surface can be achieved, an approximately "Achromatic" reduction in reflection over a band of radiation. In many cases this is adequate for the purposes envisaged, and in particular is often sufficiently broad to enable them to be used in combination with other previously-described known types of reflection-reducing layer, to compensate for the colour spot transmitted by the previously mentioned double layers to give to the overall system satisfactory characteristics. However, this type of so-called "Achromatic" reflection-reducing coating does not meet the most stringent requirements, since it cannot provide a practically complete elimination of reflections within the visible spectrum simply because, between the two minima, there lies the intermediate maximum which cannot entirely be eliminated. Moreover, it is by no means always possible to select an ideal combination of refractive indices for the two layers of the coating for use in conjunction with an underlying optical surface of any given refractive index, because obviously the number of translucent substances capable of being vaporized on to the surface in order to build up the respective layers of the coating is limited. Consequently, the available refractive indices of these layers are not infinitely variable, with the consequence that one cannot in practice always obtain even the optimum position for the minima and maximum or the desirable low values of these minima and maximum which have been theoretically calculated.

Calculations can indeed suggest that other and possibly better "Achromatic" reflection-reducing coatings could be prepared by building up the coating from three or more superposed layers, the optical thickness of these layers being integer multiples of $\lambda_0/4$. Indeed, theoretically it is possible with a three-layer coating built up from certain combinations of layers each having an optical thickness of $p.\lambda_0/4$, where $p$ is a whole number, and each having the refractive index indicated by calculation, to achieve with such a triple-layer coating a percentage reflection curve having three zero-valued minima in the residual reflection spectrum—and again theoretically with still more component layers it is possible to achieve still more zero points in the reflection curve.

In practice, however, there are great difficulties in successfully realising what can theoretically be calculated as obtainable. It can be obtained only by the use of substances having the refractive index determined by the calculations, but there are only relatively few translucent substances which meet the requirements of abrasion resistance necessary in a coating layer. The refractive indices which effectively are available to the manufacturer of reflection-reducing coatings are thus in practice restricted to a few discrete values, whereas in calculating the desired values one assumes that a continuous selection of them is available. Nor is this the only difficulty, for of equal or perhaps even greater importance, is the fact that the calculations all depend upon an assumption that the light whose reflections are to be suppressed is incident normal or substantially normal to the coating, and the principal defect of three- and multi-layer arrangements lies usually in their strong angular sensitivity in relation to the angle of light incidence, which can be observed already to be significant with slight variations of the incident light from the vertical to give an increase of reflection. The use of such multi-layer coatings is therefore of doubtful value in optical systems including lenses of small radius of curvature, as for example in microscope objectives. A further disadvantage which may also be encountered is, of course, the brittle and low-strength characteristics of the greater coating thicknesses necessarily employed.

It is the object of the present invention to provide a reflection-reducing arrangement which reduces the residual reflection to a negligibly small value and which is sensitive only to a slight extent to the angle of incidence of the radiation, and which unlike previous proposals which assume the availability of materials of continuously varrying refractive index, is based upon practical fact, inasmuch as it assumes only what in practice is the case, namely that only materials with a variety of discrete values of refractive index are available.

The invention essentially comprises an optical component having a body with at least one surface through which radiation of the nature of light within a selected range of wavelengths is required to be transmitted, in which an antireflective coating is carried on said surface, said coating consisting of $p$ layers each having a refractive index different from that of any adjoining layer, where $p$ is not less than four and the sum of the optical thickness of $(p-1)$ of said layers is equal to $3\lambda/8$ where $\lambda$ is one wavelength of radiation lying within said range.

As a preferred feature of the invention, the arrangement should be such that the optical thickness of each of the $(p-1)$ component layers is substantially less than ¼ of the mean wave length $\lambda_0$ of the range of radiations whose reflections are to be suppressed.

The principles upon which the invention is based will now be explained and illustrated in more detail, though by way of illustration only, with reference to the accompanying drawings, in which FIGURE 1 shows a diagrammatic cross-section through a glass surface bearing a four-layer coating in accordance with the invention;

Figure 1:
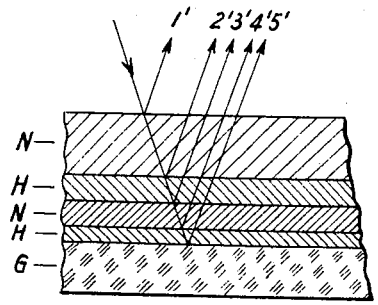

In the illustrative embodiments shown in FIGURE 1 the underlying glass surface G is provided with a four-layer coating, the component layers of which consist alternatively of a high refractive material H and a low-refractive material N.

The beam of incident radiation shown entering the coating for clarity at a slight angle from the normal, is partially reflected at each interface and the components of the incident beam reflected at each interface are shown as separate rays 1', 2', 3', 4' and 5'. Of course it is hardly necessary to say that it is the mutual interference of these reflected rays which, where the optical thicknesses of the respective component layers of the coating is correctly chosen, which reduces or eliminates reflection from the coating and underlying surface, by virtually ensuring that little or no residue of reflection is left to emerge from the upper surface of the coating.

Figure 2:
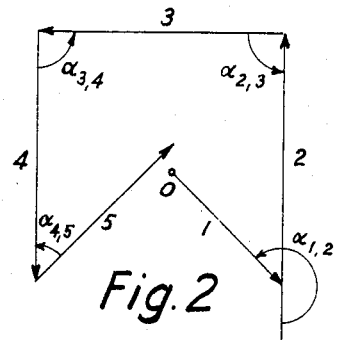
FIGURE 2 shows a simplified light vector diagram for light of wavelength $\lambda_0$, i.e., light of the mean wave length for the spectral range whose reflections are to be reduced, incident upon an arrangement as shown in FIGURE 1 above.

FIGURE 2 is a vector diagram representative both of the amplitude and the phase of the respective component rays 1' to 5' which make up the emergent residual reflected beam, in the case as already stated of light of the mean wave length $\lambda_0$. The length of each vector is proportional to the Fresnel coefficients which are decisive for the operation of the component rays, while the angles $\alpha_{1,2}$ to $\alpha_{4,5}$ enclosed between any two consecutive vectors are proportional to the phase difference between those two component rays, and thus proportional to the optical thickness, of the component layer from whose two respective interfaces those two component rays have respectively been reflected.

In FIGURE 1 the optical thicknesses of the various component layers are of course not indicated, but in preparing the vector diagrams of FIGURES 2 to 4 it has been assumed that the optical thicknesses of the component layers, working from the bottom up in FIGURE 1, is as follows. The lowermost component layer, superimposed directly upon the underlying glass surface G has an optical thickness of $\lambda_0/16$, corresponding to $\alpha_{4,5}=360/8=45°$; the optical thickness of the two next overlying component layers is each $\lambda_0/8$, corresponding to $\alpha_{3,4}=\alpha_{2,3}=360/4=90°$; while the optical thickness of the uppermost component layer is $5\lambda_0/16$, corresponding to $\alpha_{1,2}=5\times360/8=225°$.

Figure 3:
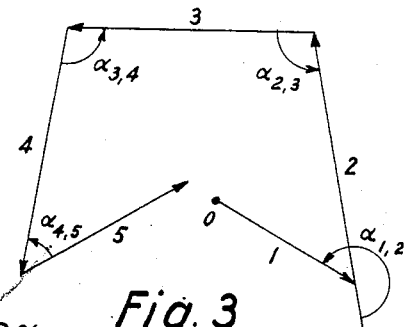
FIGURE 3 shows a simplified light vector diagram similar to that shown in FIGURE 2 above but in respect of incident light of shorter wave lengths.
Figure 4:
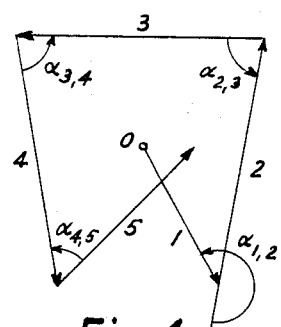
FIGURE 4 shows a simplified light vector diagram similar to that shown in FIGURE 2 above but in respect of incident light of longer wave lengths.

It will of course be appreciated that this vector diagram, like those shown also in FIGURES 3 and 4, defines the amplitude, and indeed—though this is not important—the phase of the emergent beam of residual reflection, inasmuch as no residual reflection would be emergent whatsoever, were the apex of vector 5 exactly coincident the point of origin 0 of vector 1. In fact, there is slight displacement between the apex of vector 5 and point of origin 0 even in FIGURE 2, thus in relation to the mean wave length. The separation however is very small, representing an amplitude of the emergent residual reflection of quite negligible size.

FIGURE 3 shows a similar vector diagram to FIGURE 2, for light of shorter wavelength, where the phase differences introduced between successive reflected rays are proportionately greater to those shown in FIGURE 2, with the consequence that in the vector diagram the angles between successive vectors are correspondingly increased. In an analogous but reverse manner, FIGURE 4 shows the vector diagram for incident radiation of longer wave lengths where the angles between these successive vectors are correspondingly reduced.

The vector diagram shown in all FIGURES 2 to 4 can thus be regarded as a jointed polygon, whose members shift angularly relative one to another with alteration in wave length of the incident radiation. It can be shown that (since the proportional values of the five angles in this polygon are predetermined by the component layer thicknesses) the resultant motion of the apex of vector 5 can be made to lie within a relatively small area adjacent the origin 0 of vector 1. The separation between the apex of vector 5 and the origin 0 thus can be kept to a relatively small value despite relatively large variations in incident light wave length. Thus the emergent residual reflection, proportional to the square of that separation, can be kept to a small value and it follows that as by means of very small variations in the thicknesses of the component layers of the coating, it is possible in effect to vary the length of any chosen vector in the vector diagram, by selection of layer thicknesses it can be ensured that the residual reflection which emerges from the coating as a whole is kept to a negligibly small amount over a considerable range of wave length of the incident radiation.

It has in fact been found by me that there are numerous combinations of layer thicknesses and refractive index which, guided by the principles ennunciated above, can be made to yield substantially "Achromatic" reflection-reducing coatings.

In the summation mentioned above the component layer with the greatest optical thickness must completely or nearly bring about closure of the vector polygon. If the residual reflection of the reflection-reducing coating can be made zero (or substantially zero) for any wave length in the range of wave lengths whose reflections are to be reduced, then it is found that the arrangement, dependent upon the choice of the exact layer thickness, can be made to provide an almost non-existent residual reflection over the whole range of adjacent wave lengths as well, and this is possible no matter what the refractive index of the underlying surface coated with this multilayer reflection-reducing coating.

It is particularly advantageous to arrange that the optical thickness of each of the $(p-1)$ component layers should be significantly smaller than ¼ of the mean wave length $\lambda_o$, that is the mean wave length of the range of wave lengths whose reflection is to be reduced. These rather small layer thicknesses give two significant advantages, namely good mechanical strength and, of great value, they minimize the dependence of the amount of residual reflection upon the angle of light incidence.

A specific embodiment of the invention will now be described, as follows. A glass surface of refractive index 1.52 is provided with a reflection-reducing coating built up from alternate layers of titanium dioxide ($TiO_2$), and magnesium fluoride ($MgF_2$). As a result of the method employed to build up these component layers the refractive index of the titanium dioxide layers is 2.28, while that of the magnesium fluoride layers is 1.37. As a consequence of these refractive indices, the following Fresnel coefficients are secured:

| | |
|---|---|
| Glass, $TiO_2$ | 0.20 |
| $TiO_2$, $MgF_2$ | 0.25 |
| $MgF_2$, Air | 0.156 |

The optical thicknesses of the various component layers are selected to have the following values:

| | |
|---|---|
| 1st $TiO_2$ layer | 540 A. |
| 1st $MgF_2$ layer | 565 A. |
| 2nd $TiO_2$ layer | 785 A. |
| 2nd $MgF_2$ layer | 1610 A. |

Figure 5:
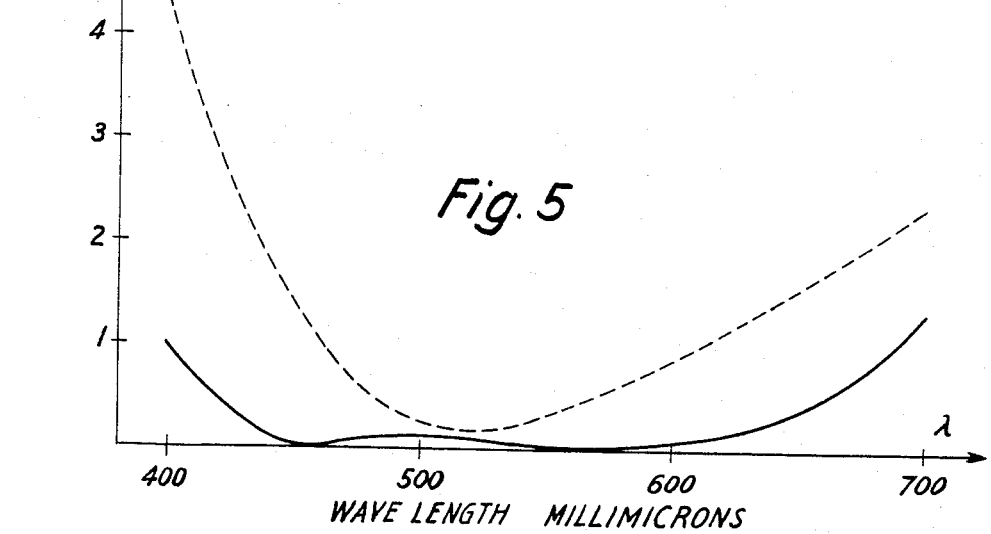
FIGURE 5 shows in graphical form the curve secured by plotting the intensity of residual reflection, expressed as a percentage of incident radiation, against wave length.

The variation in percentage of residual reflection, based on the incident radiation, with variation in wave length of the incident radiation is shown in FIGURE 5 in respect of this combination, the results being those shown in FIGURE 5 in full line. For purposes of comparison in FIGURE 5 there is also shown in dotted line a similar curve of the percentage residual reflection secured from a conventional double-layer reflection-reducing coating.

If not only the great superiority of the full-line results secured by the present invention and shown in FIGURE 5 over the dotted line results of conventional practice are taken into account, but also it is borne in mind that the layers produced by this invention are of great strength and show only a slight dependence upon the angle of incidence of the light, the advantages of the reflection-reducing coating which are produced by the present invention are aptly demonstrated.

What is claimed is:

1. An optical component having a body with at least one surface through which radiation of the nature of light within a selected range of wavelengths is required to be transmitted, in which an anti-reflective light permeable coating is carried on said surface, said coating consisting of $p$ layers having alternatively a high index of refraction and a low index of refraction, where $p$ is not less than four and the sum of the optical thicknesses of the inner $(p-1)$ of said layers is equal to three-eighths of one wavelength of radiation lying within said range, the index of refraction of the outermost layer being less than the index of refraction of the adjacent layer, and the optical thickness of said outermost layer being selected to reduce reflection to a minimum.

2. An optical component having a body with at least one surface through which radiation of the nature of light within a selected range of wavelengths is required to be transmitted, in which an anti-reflective light permeable coating is carried on said surface, said coating consisting of $p$ layers having alternatively a high index of refraction and a low index of refraction, where $p$ is not less than four, the sum of the optical thicknesses of $(p-1)$ of said layers being equal to three-eighths of one wavelength of radiation lying within said range, the index of refraction of the outermost layer being less than the index of refraction of the adjacent layer, and the optical thickness of said outermost layer being selected to reduce reflection to a minimum, and the optical thickness of each of said $(p-1)$ layers is significantly smaller than one-quarter of the mean wavelength of radiation of said selected range, the index of refraction of the outermost layer being less than the index of refraction of the adjacent layer, and the optical thickness of said outermost layer being selected to reduce reflection to a minimum.

3. An optical component having a body with at least one surface through which radiation of the nature of light within a selected range of wavelengths is required to be transmitted, in which an anti-reflective light permeable coating is carried on said surface, said coating consisting of $p$ layers having alternatively a high index of refraction and a low index of refraction, where $p$ is not less than four and the sum of the optical thicknesses of the inner $(p-1)$ of said layers is equal to three-eighths of one wavelength of radiation lying within said range, the index of refraction of the outermost layer being less than the index of refraction of the adjacent layer, and the optical thickness of said outermost layer being selected to reduce reflection to a minimum, said $(p-1)$ layers being the inner layers adjacent said surface of said body, and the remaining outermost layer of said coating having an optical thickness selected so that the end and the origin of a system of connected vectors substantially coincide, said vectors, representing, respectively, by the length thereof the Fresnel coefficient, and by the angles made with the preceeding vectors the phase difference of the radiation reflected by said $p$ layers, respectively.

4. An optical component having a body with at least one surface through which radiation of the nature of light within a selected range of wavelengths is required to be transmitted, in which an anti-reflective light permeable coating is carried on said surface, said coating consisting of $p$ layers having alternatively a high index of refraction and a low index of refraction, where $p$ is not less than four and the sum of the optical thicknesses of the inner $(p-1)$ of said layers is equal to three-eighths of one wavelength of radiation lying within said range, the index of refraction of the outermost layer being less than the index of refraction of the adjacent layer, and the optical thickness of said outermost layer being selected to reduce reflection to a minimum, said $(p-1)$ layers being the inner layers adjacent said one surface of said one body, the remaining outermost layer of said coating having for the mean wavelength of radiation of said selected range, an optical thickness substantially equal to the sum of the optical thicknesses of said ($p-1$) inner layers for said mean wavelength.

5. An optical component having a body with at least one surface through which radiation of the nature of light within a selected range of wavelengths is required to be transmitted, in which an anti-reflective light permeable coating is carried on said surface, said coating consisting of $p$ layers having alternatively a high index of refraction and a low index of refraction, where $p$ is not less than four, the sum of the optical thicknesses of ($p-1$) of said layers being equal to three-eighths of one wavelength of radiation lying within said range, the index of refraction of the outermost layer being less than the index of refraction of the adjacent layer, and the optical thickness of said outermost layer being selected to reduce reflection to a minimum, and the optical thickness of each of said ($p-1$) layers is significantly smaller than one quarter of the mean wavelength of radiation of said selected range, the index of refraction of the outermost layer being less than the index of refraction of the adjacent layer, and the optical thickness of said outermost layer being selected to reduce reflection to a minimum, said ($p-1$) layers being the inner layers adjacent said surface of said body, and the remaining outermost layer of said coating having an optical thickness selected so that the end and the origin of a system of connected vectors substantially coincide, said vectors, representing, respectively, by the length thereof the Fresnel coefficient, and by the angles made with the preceeding vectors the phase difference of the radiation reflected by said $p$ layers, respectively.

6. An optical component having a body with at least one surface through which radiation of the nature of light within a selected range of wavelengths is required to be transmitted, in which an anti-reflective light permeable coating is carried on said surface, said coating consisting of $p$ layers having alternatively a high index of refraction and a low index of refraction, where $p$ is not less than four, the sum of the optical thicknesses of ($p-1$) of said layers being equal to three-eighths of one wavelength of radiation lying within said range, the index of refraction of the outermost layer being less than the index of refraction of the adjacent layer, and the optical thickness of said outermost layer being selected to reduce reflection to a minimum, and the optical thickness of each of said ($p-1$) layers is significantly smaller than one quarter of the mean wave length of radiation of said selected range, the index of refraction of the outermost layer being less than the index of refraction of the adjacent layer, and the optical thickness of said outermost layer being selected to reduce reflection to a minimum, said ($p-1$) layers being the inner layers adjacent said one surface of said one body, the remaining outermost layer of said coating having for the mean wavelength of radiation of said selected range, an optical thickness substantially equal to the sum of the optical thicknesses of said ($p-1$) inner layers for said mean wavelength.

7. An optical component having a body with at least one surface through which radiation within a selected range of wavelengths is required to be transmitted comprising an anti-reflective light permeable coating on said surface, said coating comprising of four layers alternately consisting of titanium dioxide and magnesium fluoride having, respectively a refractive index of 2.28 and of 1.37, the optical thickness of the innermost layer adjacent said surface being $\frac{1}{16}$ of the mean wavelength of radiation of said selected range, the optical thicknesses of the two next following layers being each $\frac{1}{8}$ of said mean wavelength, and the optical thickness of the outermost layer being $\frac{3}{16}$ of said mean wavelength so that the sum of said optical thicknesses of the three inner layers is equal to $\frac{3}{8}$ of one wavelength of radiation lying within said selected range.

8. An optical component having a body with at least one surface through which radiation within a selected range of wavelengths is required to be transmitted, comprising an anti-reflective light permeable coating on said surface, said coating comprising $p$ layers, having alternatively a high index of refraction and a low index of refraction, wherein $p$ is not less than four, the optical thickness of the outermost layer of said coating for the mean wavelength of radiation of said selected range being substantially equal to the sum of the optical thicknesses of the remaining inner layers for said mean wavelength so that the end and the origin of a system of connected vectors substantially coincide, said vectors representing, respectively by the length thereof the Fresnel coefficients, and by the angles made with the preceeding vector the phase difference of the radiation reflected by $p$ layers, respectively.

References Cited by the Examiner

UNITED STATES PATENTS

| | | | |
|---|---|---|---|
| 2,331,716 | 10/1943 | Nadeau et al. | 88—1 |
| 2,366,687 | 1/1945 | Osterberg | 88—1 |
| 2,403,685 | 7/1946 | Sachtleben et al. | 117—33.3 |
| 2,420,168 | 5/1947 | Dimmick | 117—33.3 |
| 2,422,954 | 6/1947 | Dimmick | 117—33.3 |
| 2,624,238 | 1/1953 | Widdop et al. | 117—33.3 |
| 2,700,323 | 1/1955 | Schroder | 117—33.3 |
| 2,741,157 | 4/1956 | Goethert | 88—106 |
| 2,782,676 | 2/1957 | Osterberg | 88—106 |
| 2,932,592 | 4/1960 | Cameron | 117—33.3 |
| 3,147,132 | 9/1964 | Geffcken | 117—33.3 |

FOREIGN PATENTS 122,265   3/1958   Russia.

OTHER REFERENCES

R. B. Muchmore, 38 J. Opt. Soc. Am. 20 (1948).
Epstein, 42 J. Opt. Soc. Am. 806 (1952).
Epstein, 45 J. Opt. Soc. Am. 360 (1955).

JOSEPH B. SPENCER, *Primary Examiner.*

JOSEPH REBOLD, RICHARD D. NEVIUS, *Examiners.*